(12) United States Patent
Huber

(10) Patent No.: US 7,327,407 B2
(45) Date of Patent: Feb. 5, 2008

(54) INTEGRATED STRUCTURAL SCREEN PANEL FOR PROJECTION TELEVISION

(75) Inventor: Richard E. Huber, Lebanon, TN (US)

(73) Assignee: Toshiba America Consumer Products, L.L.C., Wayne, NJ (US)

( * ) Notice: Subject to any disclaimer, the term of this patent is extended or adjusted under 35 U.S.C. 154(b) by 415 days.

(21) Appl. No.: 10/786,301

(22) Filed: Feb. 26, 2004

(65) Prior Publication Data

US 2004/0165118 A1    Aug. 26, 2004

Related U.S. Application Data

(62) Division of application No. 10/212,240, filed on Aug. 6, 2002.

(51) Int. Cl.
*H04N 5/64*   (2006.01)

(52) U.S. Cl. ............ 348/789; 348/787; 348/794; 348/823

(58) Field of Classification Search ............ 348/789, 348/794, 787, 736, 823, 841–842, 904, 744; 345/173, 176; 353/75; *H04N 5/64*
See application file for complete search history.

(56) References Cited

U.S. PATENT DOCUMENTS

| | | | |
|---|---|---|---|
| 4,329,716 A | | 5/1982 | Porco |
| 4,381,421 A | | 4/1983 | Coats et al. |
| 4,715,137 A | * | 12/1987 | Scheve .......... 40/546 |
| 4,907,090 A | * | 3/1990 | Ananian .......... 348/823 |
| 5,119,271 A | | 6/1992 | Aoki et al. |
| 5,293,244 A | * | 3/1994 | Kawaguchi .......... 348/789 |
| 5,548,350 A | | 8/1996 | Yamada et al. |
| 5,581,407 A | | 12/1996 | Mitani et al. |
| 5,592,241 A | * | 1/1997 | Kita et al. .......... 348/823 |
| D398,657 S | | 9/1998 | Palmer et al. |
| 5,844,715 A | | 12/1998 | Park et al. |
| 5,910,826 A | | 6/1999 | Aoki et al. |
| 5,914,809 A | | 6/1999 | Mitani et al. |
| 6,137,548 A | | 10/2000 | Uchida et al. |
| 6,157,416 A | | 12/2000 | Whitelaw et al. |
| 6,377,320 B1 | * | 4/2002 | Ananian et al. .......... 348/836 |
| 2002/0078459 A1 | * | 6/2002 | McKay .......... 725/78 |

* cited by examiner

*Primary Examiner*—Trang U. Tran
(74) *Attorney, Agent, or Firm*—Nixon & Vanderhye PC

(57) ABSTRACT

A screen assembly for a television includes a front screen panel, an opaque masking layer applied to a perimeter of the front screen panel to define a masked perimeter area framing a viewable area of said screen assembly, and at least one touch control operatively coupled to the front screen panel in the masked perimeter area. Indicia identifies the location and/or function of the touch screen control.

20 Claims, 5 Drawing Sheets

INTEGRATED STRUCTURAL SCREEN PANEL FOR PROJECTION TELEVISION

This application is a division of application Ser. No. 10/212,240, filed Aug. 6, 2002, the entire content of which is hereby incorporated by reference in this application.

BACKGROUND OF THE INVENTION

The invention relates to projection televisions and, more particularly, to an improved screen panel for a projection television.

An example of a conventional projection television screen assembly is shown in FIG. 1. The conventional screen assembly 12 is composed of two screens, a Fresnel screen 14 and a lenticular screen 16 overlayed on the front side of the Fresnel screen. Such conventional projection TV screen assemblies require a structural/decorative frame, which usually consists of an injection molded or extruded parts to support the projection TV screens. Thus, the illustrated assembly requires a large plastic bezel 18 and metal brackets 20 to hold the screens 14, 16. More specifically, as illustrated in FIG. 1, Fresnel and lenticular screens 14, 16 are attached to the bezel frame using brackets 20 that are attached to the back of the bezel frame 18 with screws 22. The bezel frame assembly requires difficult sub-assembly processes, is prone to problems of rigidity, and limits aesthetic options.

More recently, a third screen 17 has been added to the screen assembly. This screen is typically made of clear or slightly tinted acrylic and serves to protect the more expensive lenticular screen from damage. Aesthetically, the screen protector 17 adds a smooth surface to the viewable area, similar to the glass of a direct view CRT.

As noted above, the conventional bezel frame requires a number of parts for mounting the screens so that the mounting process is long and cumbersome, thereby raising costs for both parts and labor.

BRIEF DESCRIPTION OF THE INVENTION

The present invention provides a flat panel screen for a projection television that eliminates the bezel frame structure to achieve a flat screen configuration while reducing assembly complexities and reducing the number of parts required for mounting the screens. As such, the invention offers a unique method of creating a projection TV set. Additionally, the screen of the invention offers a unique visual style which advantageously reflects the migration of projection TV technology from analog to digital.

In an embodiment of the invention, the optical and rugged aspects of the screen protector are combined with the structural rigidity and mounting functions afforded by the bezel frame to provide a single, rigid (structural) screen panel made from clear plastic or, more preferably, glass that can be fastened directly to the front of the cabinet, capturing the lenticular and Fresnel screens between the structural screen and the projection TV cabinet.

Thus, the invention may be embodied in a projection television assembly comprising a cabinet structure, a screen assembly including: a front screen panel having a front face and a rear face, said screen panel being generally flat with said front face substantially coextensive to and parallel to said rear face; a lenticular screen having a front face and a rear face, said front face being disposed in generally parallel facing relation to said rear face of said screen panel; a Fresnel screen having a front face disposed in opposed facing relation to said rear face of said lenticular screen; a plurality of fasteners projecting rearwardly from said screen panel and secured directly to said television cabinet, thereby to dispose said lenticular lens and said Fresnel lens between said screen panel and said cabinet.

The invention may also be embodied in a method of mounting a screen assembly to a projection television cabinet comprising the steps of providing a television cabinet; providing a generally flat protective screen panel having a front face and a rear face, said front face and rear face being generally coextensive and parallel; providing a lenticular screen; providing a Fresnel screen; disposing said Fresnel screen, said lenticular screen and said screen panel in that order adjacent a front surface of the television cabinet; and securing said screen panel to said projection television cabinet with fasteners that are mounted to said panel so as to project rearwardly therefrom, so as to hold said lenticular and Fresnel screens between said screen panel and said cabinet.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
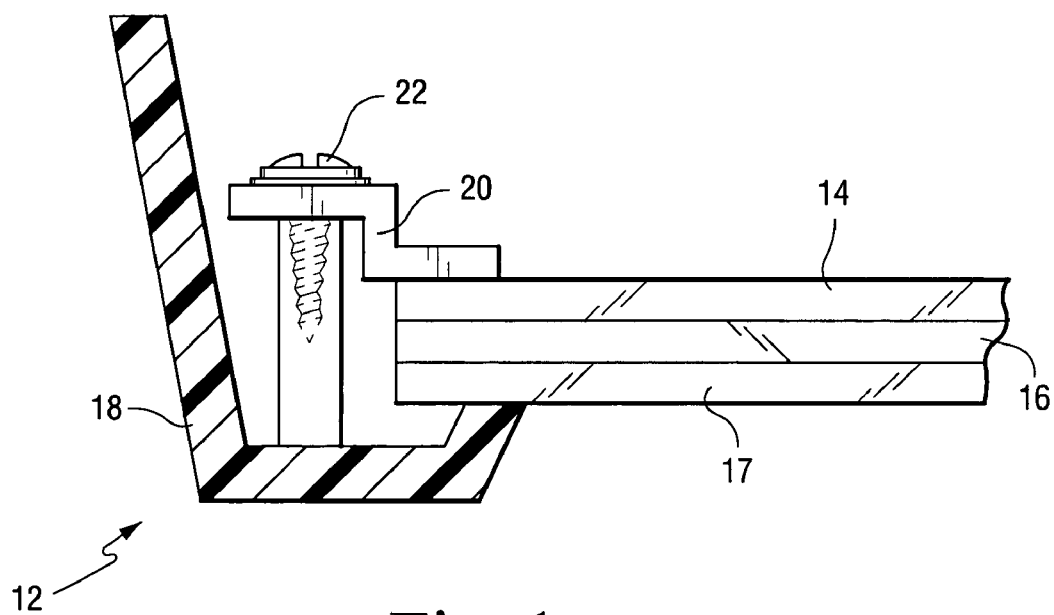
FIG. 1 is a partial schematic cross-sectional view showing a conventional bezel frame for securing screens to a conventional projection television cabinet.
Figure 2:
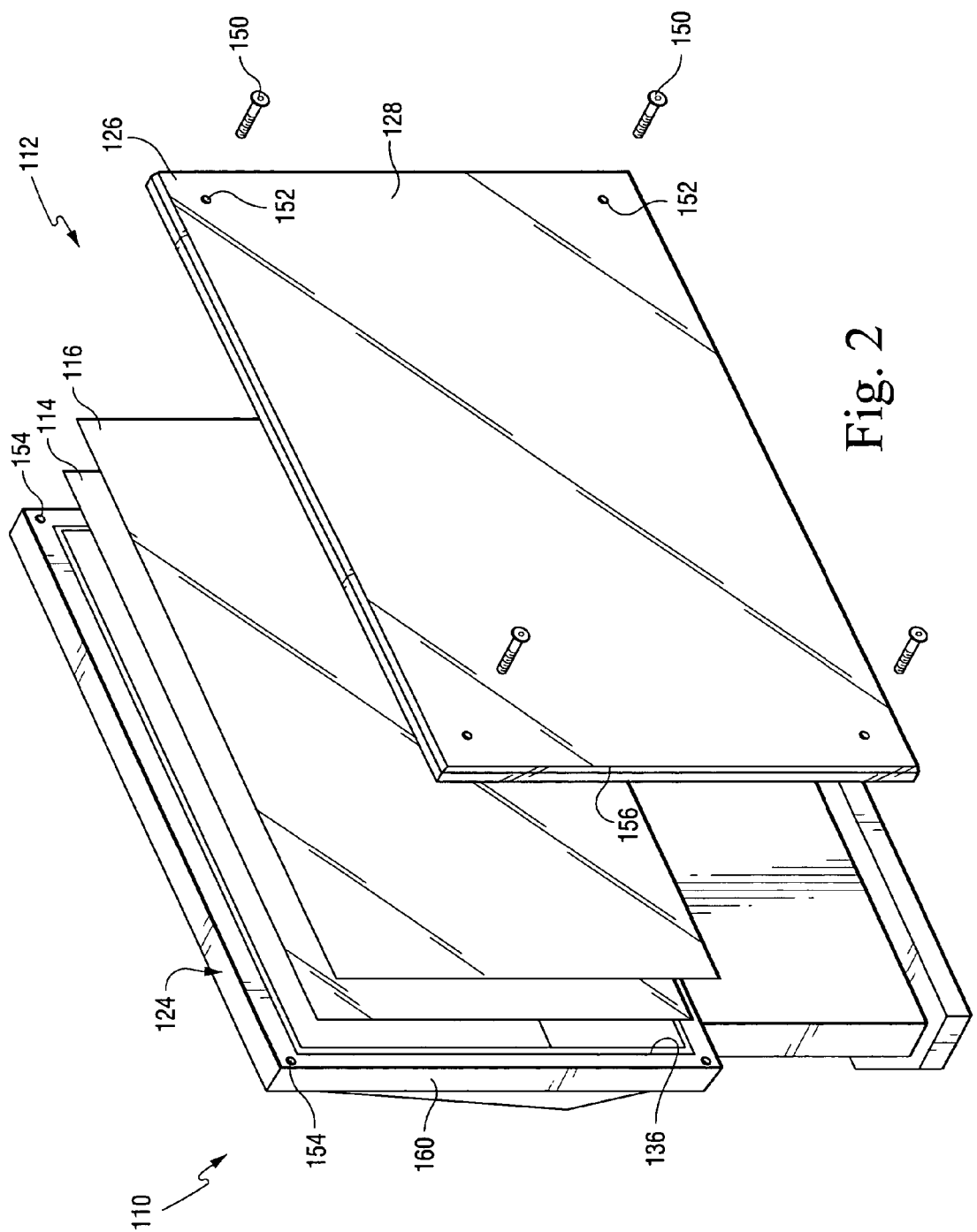
FIG. 2 is an exploded perspective view illustrating a projection panel screen assembly embodying the invention and the associated projection TV cabinet.
Figure 3:
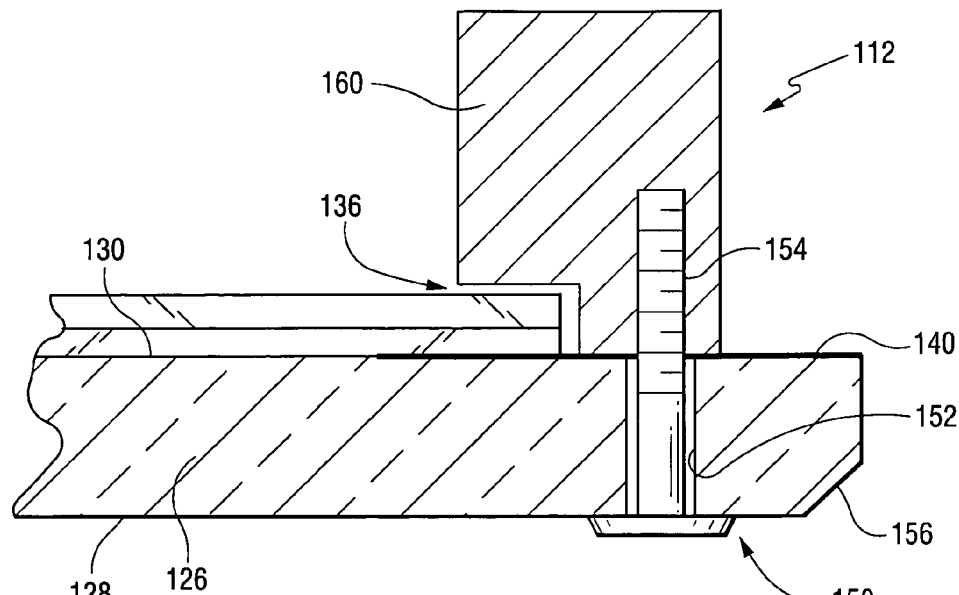
FIG. 3 is a partial schematic cross-sectional view illustrating the assembly of a screen panel to a projection television cabinet according to a first embodiment of the invention.
Figure 4:
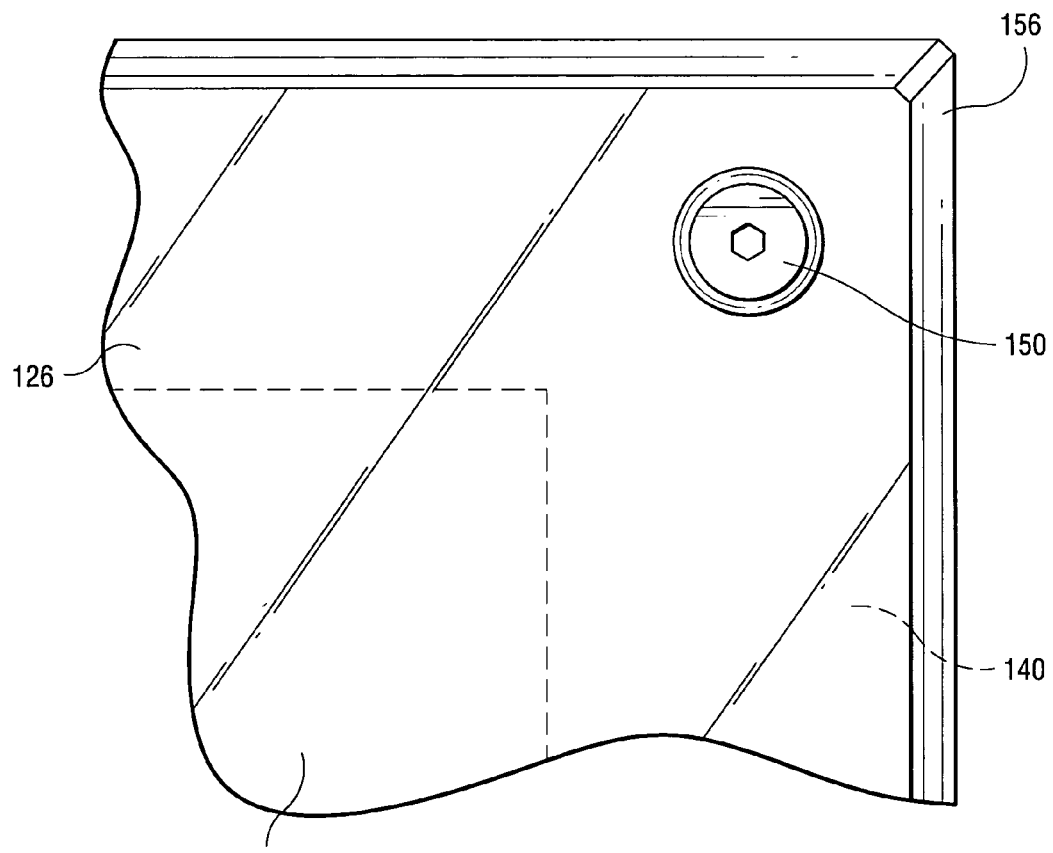
FIG. 4 is an elevational view of the structure shown in FIG. 3.

A projection television 110 having a panel screen assembly 112 embodying the invention is illustrated by way of example in FIG. 2. FIGS. 3 and 4 are enlarged cross-sectional and elevational views, respectively, of the upper right hand corner of the screen assembly 112 of FIG. 1, illustrating assembly details. In this embodiment, a conventional Fresnel screen 114 and a conventional lenticular screen 116 are provided for being mounted to a projection television cabinet 124. In accordance with the invention, a protective, structural screen panel 126 is provided to protect the more expensive lenticular screen 116 from damage and to mount both the lenticular and Fresnel screens to the television cabinet 124. The protective screen panel is made of either clear or slightly tinted plastic, such as acrylic or polycarbonate, or, more preferably, clear or slightly tinted glass as discussed more specifically below. Thus, as illustrated, the screen panel has a front face 128 and a rear face 130. The screen panel is generally flat with front face 128 substantially coextensive to and parallel to the rear face 130. The projection television cabinet 124 itself may be made of wood, plastic, metal or the like.

In accordance with the invention, a plurality of fasteners are provided to project rearwardly from the screen panel for securing the screen panel 126 to the rear cabinet structure 124. In the embodiment of FIG. 2 the screen panel 126 is secured directly to the front face of the rear cabinet structure 124 with a plurality of fasteners 150. A plurality of apertures 152 are defined through the screen panel, for example, adjacent each of the four corners of the screen panel 126 for receiving respective fasteners. A corresponding fastener receptacle 154 is defined at the four corners of the projection television cabinet 124. In the illustrated embodiment, the edges of the screen panel are beveled as at 156 and polished to provide an aesthetically pleasing screen finish.

In an exemplary embodiment, the fasteners are decorative bolts. In such a case, the bores 154 defined in the cabinet for receiving the respective decorative bolts are threaded bores that are either integrally defined in the projection television cabinet or may be defined in a component that is an insert to the cabinet front face.

Although decorative bolts are illustrated for securing the screen panel to the television panel, it is to be understood that other fasteners, such as snap-lock fasteners, expanding fasteners and similar such detachable fastener structures may be provided for detachably securing the screen panel to the television cabinet. Furthermore, decorative caps (not shown) may be secured to the exposed fastener heads to provide a more finished look.

As will be appreciated, the provision of a relatively thick, flat glass or plastic screen panel 126 as shown combines the function of both the conventional screen protector 17 and the structural frame (bezel) assembly 12. Mounting the screen panel directly to the television cabinet with bolts allows the conventional screen brackets 20 to be eliminated. As the screen panel is a fabricated item, prohibitive tooling costs can be eliminated, making the development of lower volume models practical. Indeed, the ability to fabricate parts for the invention rather than invest in tooling is a significant advantage of the invention. In this regard, to the extent the prior art contemplated glass as a structural member in a product of the type described, it was a molded panel incorporating characteristics of the Fresnel and/or lenticular lenses. Such an approach would involve a large investment and high cost. In contrast, the invention enables the use of commonly available tempered float glass, which can be produced for no investment and at a low cost.

In an exemplary embodiment of the invention, as illustrated in FIG. 3, a recess 136 is defined about the inner periphery of the cabinet side wall 160 for receiving the Fresnel and lenticular screens 114, 116. Thus, when the screen panel 126 is secured to the cabinet structure 124, the Fresnel and lenticular screens 114, 116 are disposed, in this embodiment sandwiched, between the screen panel 126 and the sidewall cabinet 124 so as to be securely mounted thereto. Providing a recess 136 in the cabinet face also simplifies the manufacturing process and cost of the front panel, which is maintained as a flat glass or plastic panel.

As is apparent from the foregoing, the assembly of the invention provides the look of a flat panel product by omitting the conventional bezel frame 18. The screen panel 126 can thus extend beyond the picture area giving a thin, flat panel image that cannot be achieved with current assembly methods. Furthermore, in an exemplary embodiment, a portion of the rear face of the screen panel is black silk screened as at 140 thereby to frame the viewable area 180 as illustrated in FIG. 4. It is noted that the provision of black silk screen for framing the viewable area creates an aesthetically pleasing floating screen characteristic.

Figure 5:
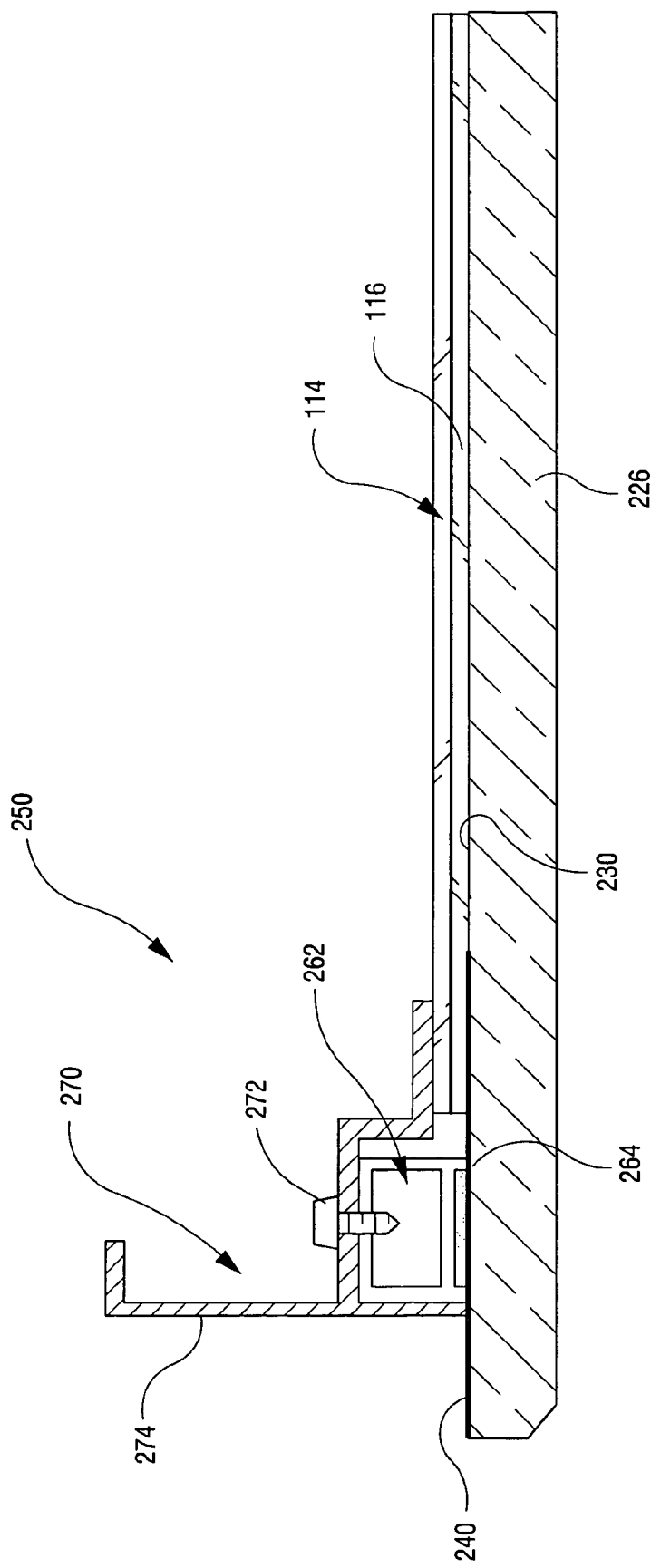
FIG. 5 is a partial schematic cross-sectional view illustrating the assembly of a screen panel to a projection television cabinet according to a second embodiment of the invention.

According to another, alternate embodiment of the invention, the fasteners 250 may be secured to the back face of the screen panel rather than disposed through apertures. An example of such an alternative is illustrated in FIG. 5. In this embodiment, a plurality of mounting blocks 262 are secured to the back side 230 of the panel 226 with suitable high strength adhesive 268. Each mounting block may be about 1 inch long and several, e.g., three or four, may be secured adjacent each peripheral side edge of the panel 226. Brackets 270 are then secured to the mounting blocks with screws 272. In an exemplary embodiment, one bracket is provided per side. As illustrated, the bracket 270 is advantageously shaped to clamp the screens 114, 116 to the panel 226 when the bracket is secured to the mounting blocks 262 and to present a securing lip 274 that is fastened in turn to the television cabinet (not shown in FIG. 5). The screen panel is advantageously silk screened as at 240 before the mounting blocks are secured thereto to provide a border to hide the adhesive, mounting blocks and brackets.

An advantage of the embodiment of FIG. 5 is that holes are not required in the glass (or plastic) panel, so that the screen presents a fully floating appearance. Also, the screen and panels can be assembled to the brackets as a subassembly, which may facilitate assembly operations.

Although the screen panel may be formed either from plastic, such as acrylic or polycarbonate, or glass, it is noted that glass is preferred. In that regard, whereas conventional screens are, e.g., acrylic, as noted above, the screen of the invention may be fabricated from glass as it is a panel having flat, coextensive front and rear faces. The protective characteristics of glass, clarity of image, resistance to scratching and resistance to damage from cleaning solutions all make glass a highly desirable screen material to the consumer. Moreover, the ability of glass to convey an image or perception of quality by emulating the look and feel of a direct view (CRT) model is a desirable product characteristic. The ability to place the lenticular and Fresnel screens directly against the back of the glass panel is an additional advantage of the proposed construction. Indeed, alternative construction methods leave an air gap between the screen protector and the screens which is susceptible to producing a "ghost" image on the back side of the protective panel/screen caused by internal reflections of the image. Thus, the ability to provide a glass screen panel, while omitting the bezel, is a significant improvement from a production cost and marketability viewpoint.

Figure 6:
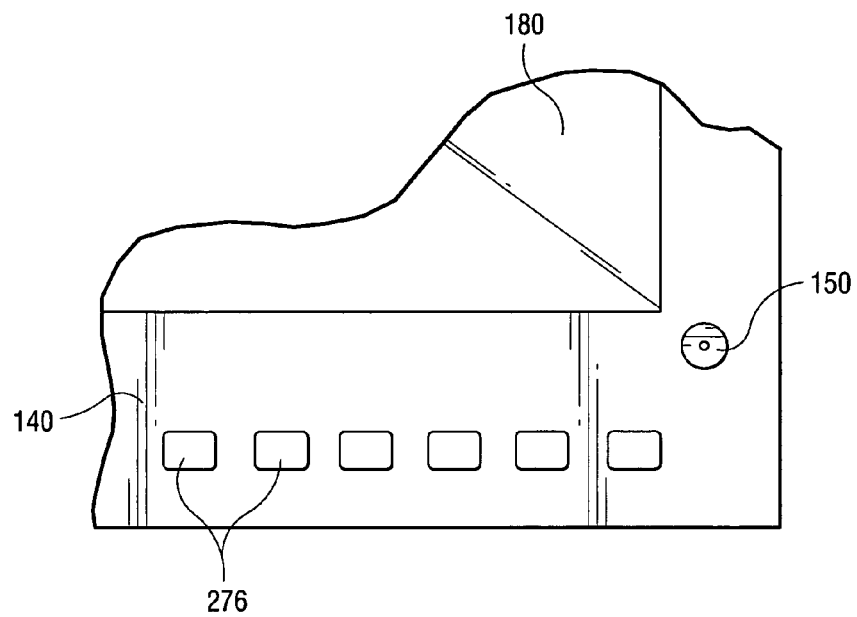
FIG. 6 is partial elevational view of an integrated touch control according to the invention.
Figure 7:
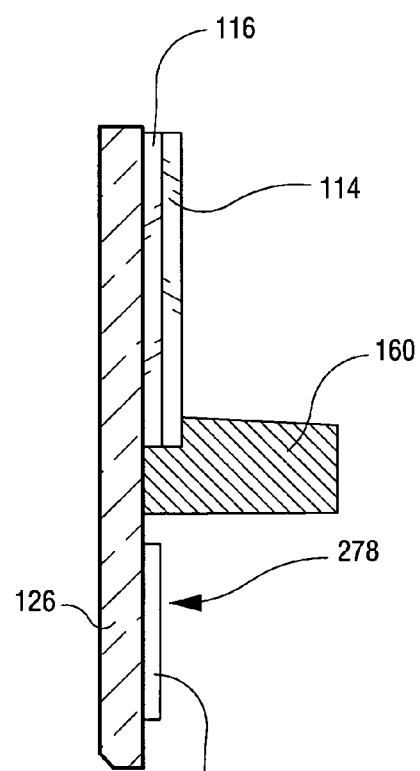
FIG. 7 is a partial schematic cross-sectional view illustrating the assembly of FIG. 6.

Referring now to FIGS. 6 and 7, according to a further feature of the invention, touch controls may be integrated onto the surface of the television screen panel. In the illustrated embodiment, the touch controls have been integrated directly onto the glass panel 126 in the area covered by the silk screened border 140, directly below the viewable area 180. To accommodate such touch controls, text and/or artwork indicating the location and function of the controls are silk screened on the back surface of the glass, as schematically shown at 276, prior to screening the border 140. The control Printed Circuit Board (PCB) incorporating suitable touch sensors 278 is attached to the back of the glass panel with adhesive after the border 140 has been silk screened.

The incorporation of touch controls provides viewing and controlling on one contiguous surface, thereby providing a high tech look, and eliminates the need for parts associated with a separate control panel. As will be appreciated, the touch sensors of the invention could be applied to any TV product such as rear projector, falt CRT direct view, etc. Indeed, the touch controls would be particularly well adapted to newer flat panel products such as Plasma or LCD televisions.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A television assembly comprising a housing and a screen assembly secured to said housing, said screen assembly including:
   a front screen panel having a front face and a rear face, said front face being parallel to said rear face;
   an opaque masking layer applied to a perimeter of at least one of said front and rear faces of said front screen panel so as to define a masked perimeter area framing a viewable area of said screen assembly;
   at least one touch control operatively coupled to at least one of said front and rear faces of said front screen panel in said masked perimeter area;
   and wherein said at least one touch control operatively coupled to said front screen panel comprises a touch sensor attached to the rear face of the front screen panel.

2. The television assembly of claim 1, wherein said touch sensor is adhesively attached.

3. The television assembly of claim 1, further comprising indicia identifying at least one of a location and a function of said at least one touch control provided on at least one of said front and rear faces of said front screen panel and visible from a front of said screen assembly.

4. The television assembly of claim 3, wherein said indicia comprises at least one of text and artwork indicating the location and function of the touch control.

5. The television assembly of claim 3, wherein said masking layer is applied to said rear face of said front screen panel and wherein said indicia is provided on said rear face prior to applying said masking layer.

6. The television assembly of claim 1, wherein said masking layer is applied to said rear face of said front screen panel and the touch sensor is attached to said rear face after applying said masking layer.

7. The television assembly of claim 1, wherein the front screen panel is formed from glass.

8. The television assembly of claim 1, wherein said masking layer is silk screened to a perimeter of the rear face of the front screen panel to define said masked perimeter area.

9. The television assembly of claim 1, wherein said front screen panel has a length and width greater than a length and width of said housing so that said front screen panel projects beyond said housing.

10. The television assembly of claim 1, wherein the front screen panel is flat.

11. The television assembly of claim 1, wherein said front face is substantially coextensive to said rear face.

12. The television assembly of claim 1, wherein the television assembly is one of a plasma television, an LCD television, and a projection television.

13. In a television assembly, a screen assembly comprising:
   a generally flat front screen panel having a front face and a rear face;
   an opaque masking layer applied to a perimeter of at least one of said front and rear faces of said front screen panel so as to define a masked perimeter area framing a viewable area of said screen assembly;
   at least one touch control operatively coupled to at least one of said front and rear faces of said front screen panel in said masked perimeter area;
   and wherein said at least one touch control operatively coupled to said front screen panel comprises a touch sensor attached to the rear face of the front screen panel.

14. The assembly of claim 13, wherein said touch sensor is adhesively attached.

15. The assembly of claim 13, wherein said masking layer is applied to said rear face of said front screen panel and the touch sensor is attached to said rear face after applying said masking layer.

16. The assembly of claim 13, wherein the front screen panel is formed from glass.

17. The assembly of claim 13, wherein said masking layer is silk screened to a perimeter of the rear face of the front screen panel to define said masked perimeter area.

18. The assembly of claim 13, further comprising indicia identifying at least one of a location and a function of said at least one touch control provided on at least one of said front and rear faces of said front screen panel and visible from a front of said screen assembly.

19. The assembly of claim 1, wherein said at least one touch control is adhered directly to the front or rear face of said screen panel.

20. The assembly of claim 13, wherein said at least one touch control is adhered directly to the front or rear face of said screen panel.

* * * * *